United States Patent

Meguriya et al.

[11] Patent Number: 5,645,941
[45] Date of Patent: Jul. 8, 1997

[54] SILICONE RESIN/SILICONE RUBBER COMPOSITE MATERIAL

[75] Inventors: Noriyuki Meguriya; Takeo Yoshida, both of Annaka, Japan

[73] Assignee: Shin-Etsu Chemical Co., Ltd., Tokyo, Japan

[21] Appl. No.: 440,056

[22] Filed: May 12, 1995

Related U.S. Application Data

[63] Continuation-in-part of Ser. No. 154,513, Nov. 19, 1993, abandoned.

[30] Foreign Application Priority Data

Nov. 19, 1992 [JP] Japan ................................ 4-333616
Aug. 19, 1993 [JP] Japan ................................ 5-226409

[51] Int. Cl.$^6$ ........................ B32B 9/04; C08F 283/12; C08L 83/04
[52] U.S. Cl. ........................ 428/447; 525/477; 525/478; 427/387; 427/393.5
[58] Field of Search ............... 428/447; 525/478, 525/477; 427/387, 393.5

[56] References Cited

U.S. PATENT DOCUMENTS

| | | | |
|---|---|---|---|
| 3,567,493 | 3/1971 | Wessel et al. | 117/76 |
| 4,360,563 | 11/1982 | Stengle | 428/323 |
| 4,511,620 | 4/1985 | Kroupa et al. | 428/447 |
| 4,814,231 | 3/1989 | Onohara et al. | 428/448 |
| 5,279,890 | 1/1994 | Ikeno et al. | 428/217 |

FOREIGN PATENT DOCUMENTS 480680  4/1992  European Pat. Off. .
1907980 11/1969  Germany .

*Primary Examiner*—Karen A. Dean
*Attorney, Agent, or Firm*—Birch, Stewart, Kolasch & Birch, LLP

[57] ABSTRACT

By curing or semi-curing an addition curable silicone resin composition comprising a phenyl-containing organopolysiloxane, placing an addition or peroxide curable silicone rubber composition in close contact with the cured or semi-cured resin, and heat curing the silicone rubber composition, there is prepared a composite material in which silicone resin and silicone rubber are firmly joined together.

12 Claims, 1 Drawing Sheet

SILICONE RESIN/SILICONE RUBBER COMPOSITE MATERIAL

CROSS REFERENCE TO RELATED APPLICATION

This application is a continuation-in-part of application Ser. No. 08/154,513 filed on Nov. 19, 1993, now abandoned, the entire contents of which are hereby incorporated by reference.

BACKGROUND OF THE INVENTION

1. Field of the Invention

This invention relates to silicone resin/silicone rubber composite materials for use in various industrial fields including electric and electronic equipment, business machines, automobiles, and precision machines.

2. Prior Art

A number of methods are known in the art for producing shapes having two distinct silicone parts integrated together. Most methods involved separately heat molding distinct silicone compositions and adhesively joining the molded parts into an integral product.

These methods, however, suffer from the problem that adhesive joining of distinct silicone parts is difficult and time consuming and even when possible, the bond is weak, resulting in an integral product having low dimensional accuracy.

In addition to these methods, integral products in which silicone resin is integrated with silicone rubber can also be produced by coating silicone rubber with silicon resin, for example. The coating method is difficult to carry out and finds use only in coating applications. Because of fragility of the silicone resin itself and weak bond between silicone resin and silicon rubber, the resulting products are inadequate for use as composite materials.

An integral product having combined silicones of different hardnesses has been used as a coating on fiber optics. In this proposal, no attention is paid to the bond between distinct silicone parts.

Over the past years, silicone rubber has found a spreading range of applications in electric and electronic equipment, business machines and automobiles because of its recognized reliability in heat resistance, weatherability and electrical characteristics. Currently available composite materials of silicone rubber with thermoplastic or thermosetting hydrocarbon resins, however, do not take full advantage of the characteristics of silicone rubber. There is a need to have an integrally molded silicone resin/silicone rubber material in which silicone resin and silicone rubber are firmly bonded.

SUMMARY OF THE INVENTION

Therefore, an object of the present invention is to provide a silicone resin/silicone rubber composite material in which silicone resin and silicone rubber are firmly bonded.

We have found that by using a phenyl-containing organopolysiloxane as a silicone resin base, curing or semi-curing an addition curable silicone resin composition comprising the phenyl-containing organopoly-siloxane, placing an addition or peroxide curable silicone rubber composition in close contact with the cured or semi-cured resin, and heat curing the silicone rubber composition to integrate the rubber to the previously cured or semi-cured resin, there is obtained a composite material in which silicone resin and silicone rubber are firmly bonded. The order of first curing an addition curable silicone resin composition and then curing a silicone rubber composition to the cured resin permits the integration of silicone resin and silicone rubber to be briefly accomplished in a simple manner without an adhesive. There is obtained a silicone resin/silicone rubber composite material having a sufficient bonding force for practical use.

According to the present invention, there is provided a silicone resin/silicone rubber composite material comprising a cured product of an addition curable silicone resin composition having a hardness of at least 85 as specified in JIS K-6301, entitled Physical Testing Methods for Vulcanized Rubber of the Japanese Industrial Standard (JIS K-6301 is incorporated herein by reference. The hardness of the silicone resin and silicone rubber compositions is measured on a Type A spring hardness tester. The tester has a test piece indentor projecting from a hole in the center of the loading surface by means of a spring that is pushed back by the surface of the test piece. The distance moved by the spring is indicated by a pointer on the scale of the tester, which indicates the hardness of the test piece. A test piece of not less than 12 mm thickness is used. The surface of the test piece should be large enough such that the loading surface of the tester is within the boundary thereof), and measured on a Type A spring hardness tester, integrated with a cured product of an addition or peroxide curable silicone rubber composition having a hardness of 20 to 85 as specified in JIS K-6301 and measured on a Type A spring hardness tester, that is obtained by curing or semi-curing the addition curable silicone resin composition, placing the addition or peroxide curable silicone rubber composition in close contact with the cured or semi-cured silicone resin composition, and heat curing the silicone rubber composition, said silicone resin composition comprising an organopolysiloxane of the following formula (1):

$$R_n(C_6H_5)_m SiO_{(4-n-m)/2} \qquad (1)$$

wherein R is independently a substituted or unsubstituted aliphatic or alicyclic monovalent hydrocarbon radical having 1 to 20 carbon atoms, 0.1 to 30 mol % of R being an aliphatic unsaturated hydrocarbon radical, and letters n and m are positive numbers satisfying $1 \leq n+m < 2$ and $0.05 \leq m/(n+m) \leq 0.5$.

DETAILED DESCRIPTION OF THE INVENTION

Figure 1:
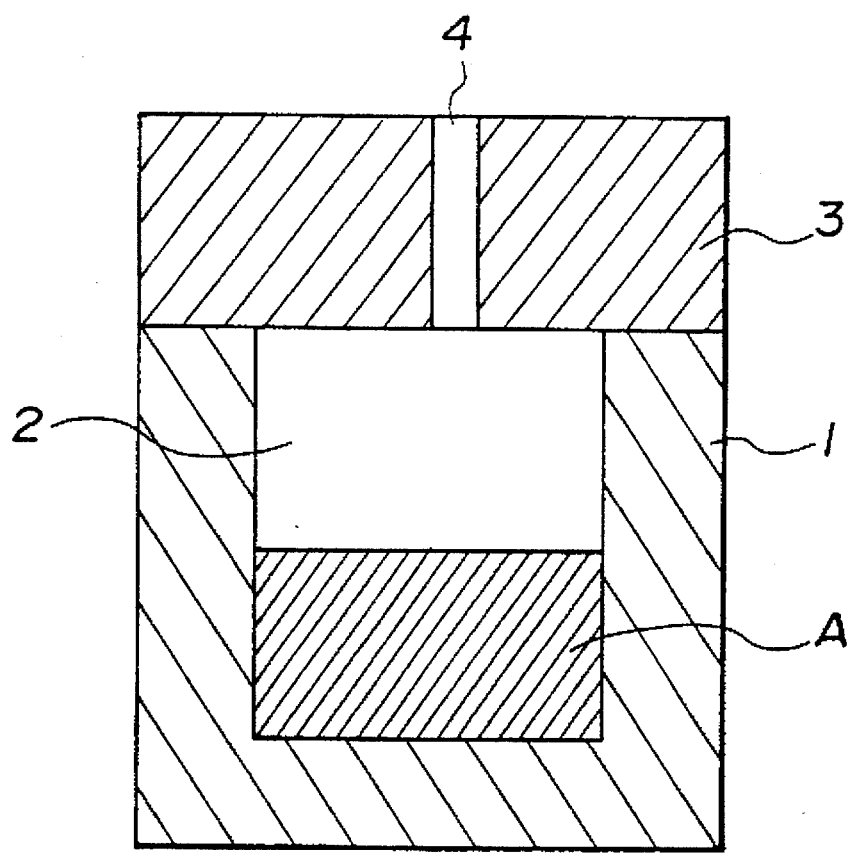
FIGURE 1 is a schematic cross section of a mold used in the manufacture of a silicone resin/silicone rubber composite material.

The silicone resin/silicone rubber composite material of the present invention includes an addition curable silicone resin composition and an addition or peroxide curable silicone rubber composition which are heat cured to form an integral or one-piece product. The silicone resin composition is comprised of an organopolysiloxane of the general formula (1).

$$R_n(C_6H_5)_m SiO_{(4-n-m)/2} \qquad (1)$$

In formula (1), R is independently a substituted or unsubstituted aliphatic or alicyclic monovalent hydrocarbon radical, preferably having 1 to 20 carbon atoms, more preferably 1 to 10 carbon atoms. Exemplary hydrocarbon radicals include saturated hydrocarbon radicals, for example, alkyl radicals such as methyl, ethyl and propyl and cycloalkyl radicals, aliphatic unsaturated hydrocarbon radicals such as vinyl, allyl, propenyl and butenyl, halo-substituted hydrocarbon radicals such as 3,3,3-trifluoropropyl, and cyano-substituted hydrocarbon radicals. It is required that 0.1 to 30 mol %, preferably 1 to 20 mol % of R be an aliphatic unsaturated hydrocarbon radical, preferably an alkenyl radical. If the content of aliphatic unsaturated hydrocarbon radical is less than 0.1 mol %, the resulting silicone resin is insufficiently hard and poorly adhesive to silicone rubber. If the content of aliphatic unsaturated hydrocarbon radical is more than 30 mol %, the silicone resin becomes brittle because of too many crosslinking sites. Letters n and m are positive numbers satisfying $1 \leq n+m < 2$, and the content of phenyl radical is 5 to 50 mol % of the overall organic radicals, that is, $0.05 \leq m/(n+m) \leq 0.5$. With a phenyl content outside this range, the silicone resin is brittle in molded form.

These organopolysiloxanes can be prepared by conventional well-known methods, for example, by co-hydrolysis of dimethylchlorosilane, phenyltrichlorosilane and methylvinyldichlorosilane or by co-hydrolysis of dimethyldimethoxysilane, phenyltrimethoxysilane and vinyltrimethoxysilane in the presence of an alkali or acid catalyst.

Preferably the silicone resin composition used herein includes as major components, (a) an organopolysiloxane of formula (1),
(b) an organohydrogenpolysiloxane which is liquid at room temperature (for example, 5° to 30° C.), and
(c) an addition reaction catalyst, and optionally,
(d) an organopolysiloxane containing two or more alkenyl radicals per molecule which is liquid or raw rubber at 5° to 30° C.) when it is desired to control the hardness of the silicone resin composition to the above-defined value or to control the viscosity or the like.

The organohydrogenpolysiloxane (b) may have the following formula:

wherein R' represents an unsubstituted or substituted monovalent hydrocarbon radical having 1 to 10 carbon atoms excluding an aliphatic unsaturated radical, a is a positive number of 1 to 2.1, b is a positive number of 0.5 to 1 and a+b is 1.5 to 2.6.

Examples of the organohydrogenpolysiloxane as component (b) include methylhydrogenpolysiloxane blocked with a trimethylsiloxy radical at either end, dimethylsiloxanemethylhydrogenpolysiloxane copolymers blocked with a trimethylsiloxy radical at either end, dimethylsiloxane blocked with a dimethylhydrogensiloxy radical at either end, dimethylsiloxane-methylhydrogenpolysiloxane copolymers blocked with a dimethylhydrogensiloxy radical at either end, methylhydrogenpolysiloxanediphenylsiloxane blocked with a trimethylsiloxy radical at either end, methylhydrogenpolysiloxane-dimethylsiloxane blocked with a trimethylsiloxy radical at either end, copolymers consisting of $(CH_3)_2HSiO_{1/2}$ and $SiO_{4/2}$ units, copolymers consisting of $(CH_3)_3SiO_{1/2}$, $(CH_3)_2HSiO_{1/2}$ and $SiO_{4/2}$ units, and copolymers consisting of $(CH_3)_2HSiO_{2/1}$, $SiO_{4/2}$ and $(C_6H_5)_3SiO_{3/2}$ units. The organohydrogenpolysiloxane (b) is preferably blended in an amount of about 1 to 50 parts, more preferably about 5 to 30 parts by weight per 100 parts by weight of organopolysiloxane (a). With less amounts of organohydrogenpolysiloxane, the silicone resin would have low hardness. With greater amounts of organohydrogenpolysiloxane, the cured resin would become brittle failing to provide satisfactory strength.

Examples of the addition reaction catalyst (c) include platinum catalysts such as platinum black, platinic chloride, chloroplatinic acid, reaction products of chloroplatinic acid with monohydric alcohols, complexes of chloroplatinic acid with olefins, platinum bisacetoacetate, palladium catalysts, and rhodium catalysts. The catalyst may be used in a catalytic amount.

The organopolysiloxane of component (d) preferably has the following general compositional formula:

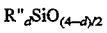

wherein R" is an unsubstituted or substituted monovalent hydrocarbon group having 1 to 10 carbon atoms such as alkyl, alkenyl, aryl, aralkyl, and halogen or cyano substituted alkyl groups, and d is a positive number of 1.8 to 2.4.

The organopolysiloxane should have at least two alkenyl radicals preferably having 2 to 8 carbon atoms per molecule. Examples of alkenyl radicals include vinyl, allyl, propenyl, isopropenyl, butenyl and hexenyl.

Examples of the organopolysiloxane containing two or more alkenyl radicals in a molecule which is liquid or raw rubber at 5° to 30° C. of component (d) include dimethylpolysiloxane blocked with a dimethylvinylsilyl radical at either end, dimethylpolysiloxanemethylvinylsiloxane copolymers blocked with a dimethylvinylsilyl radial at either end, dimethylpolysiloxane-diphenylsiloxane-methylvinylsiloxane copolymers blocked with a dimethylvinylsilyl radical at either end, dimethylpolysiloxane-diphenylsiloxane-methylvinylsiloxane copolymers blocked with a methylphenylvinylsilyl radical at either end, and methyl(3,3,3-trifluoropropyl)polysiloxane blocked with a dimethylvinylsilyl radical at either end. The organopolysiloxane (d) is preferably blended in an amount of 0 to 100 parts by weight per 100 parts by weight of organopolysiloxane (a), more preferably 0 to 50 parts, particularly 1 to 50 parts by weight per 100 parts by weight of organopolysiloxane (a) so as not to detract from the strength of the resin.

In addition to the above-mentioned components, fillers may be blended in an amount of 0 to 200 parts, preferably 0 to 100 parts by weight per 100 parts by weight of organopolysiloxane (a) in the silicone resin composition for adjusting the flow thereof or improving the mechanical strength of molded parts. Exemplary fillers include reinforcing fillers such as precipitated silica, fumed silica, calcined silica, and fumed titanium oxide, and non-reinforcing fillers such as ground quartz, diatomaceous earth, asbestos, aminosilicic acid, iron oxide, zinc oxide, and calcium carbonate. The fillers may be used with or without surface treatment with organic silicon compounds such as hexamethyldisilazane, trimethylchlorosilane and polymethylsiloxane. If desired, pigments, heat resistance modifiers, flame retardants, plasticizers or the like may be blended.

On the other hand, the silicone rubber composition used herein may be either addition reaction curable or peroxide curable. The addition curable silicone rubber composition preferably includes as major components, (e) an organopolysiloxane containing on average at least two lower alkenyl radicals in a molecule, (f) an organohydrogenpolysiloxane having at least two hydrogen atoms directly attached to silicon atoms in a molecule, and (g) an addition reaction catalyst and is liquid or raw rubber at room temperature.

The organopolysiloxane of component (e) preferably has the following general compositional formula:

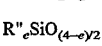

wherein R" is as defined above and e is a positive number of 1.85 to 2.25.

Examples of the organopolysiloxane (e) include dimethylpolysiloxane blocked with a dimethylvinylsilyl radical at either end, dimethylpolysiloxane-methylvinylsiloxane copolymers blocked with a dimethylvinylsilyl radical at either end, dimethylpolysiloxane-diphenylsiloxane-methylvinylsiloxane copolymers blocked with a dimethylvinylsilyl radical at either end, dimethylpolysiloxane-diphenylsiloxane-methylvinylsiloxane copolymers blocked with a methylphenylvinylsilyl radical at either end, and methyl(3,3,3-trifluoropropyl)-polysiloxane blocked with a dimethylvinylsilyl radical at either end. These organopolysiloxanes preferably have a viscosity of about 100 to about 1,000,000 centipoise at 25° C.

The organohydrogenpolysiloxane (f) may have the following formula:

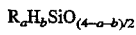

wherein R represents an unsubstituted or substituted monovalent hydrocarbon radical having 1 to 10 carbon atoms excluding an aliphatic unsaturated radical, a is a positive number of 1 to 2.1, b is a positive number of 0.5 to 1 and a+b is 1.5 to 2.6.

Examples of the organohydrogenpolysiloxane (f) include methylhydrogenpolysiloxane blocked with a trimethylsiloxy radical at either end, dimethylsiloxane-methylhydrogenpolysiloxane copolymers blocked with a trimethylsiloxy radical at either end, dimethylsiloxane blocked with a dimethylhydrogensiloxy radical at either end, and dimethylsiloxane-methylhydrogenpolysiloxane copolymers blocked with a dimethylhydrogensiloxy radical at either end. These organohydrogenpolysiloxanes preferably have a viscosity of about 1 to about 1,000 centipoise at 25° C. The organohydrogenpolysiloxane (f) is preferably blended in an amount of about 0.1 to 50 parts, more preferably about 0.5 to 20 parts by weight per 100 parts by weight of organopolysiloxane (e).

Examples of the addition reaction catalyst (g) include platinum catalysts such as platinum black, platinic chloride, chloroplatinic acid, reaction products of chloroplatinic acid with monohydric alcohols, complexes of chloroplatinic acid with olefins, platinum bisacetoacetate, palladium catalysts, and rhodium catalysts. The catalyst may be used in a catalytic amount.

In addition to the above-mentioned components, fillers may be blended in an amount of 0 to 100 parts, preferably 1 to 80 parts, more preferably 5 to 60 parts by weight per 100 parts by weight of organopolysiloxane (e) in the silicone rubber composition for adjusting the flow thereof or improving the mechanical strength of molded parts. In case of using reinforcing fillers, they are blended in an amount of 0 to 50 parts, preferably 5 to 40 parts, more preferably 10 to 30 parts by weight per 100 parts by weight of organopolysiloxane (e). Exemplary fillers include reinforcing fillers such as precipitated silica, fumed silica, calcined silica, and fumed titanium oxide, and non-reinforcing fillers such as ground quartz, diatomaceous earth, asbestos, aminosilicic acid, iron oxide, zinc oxide, and calcium carbonate. The fillers may be used with or without surface treatment with organic silicon compounds such as hexamethyl-disilazane, trimethylchlorosilane and polymethylsiloxane. If desired, pigments, heat resistance modifiers, flame retardants, plasticizers or the like may be blended.

The peroxide curable silicone rubber composition preferably includes as major components, (h) an organopolysiloxane containing on average at least two lower alkenyl radicals in a molecule and (i) an organic peroxide catalyst and is liquid or raw rubber at 5° to 30° C.

The organopolysiloxane of component (h) preferably has the following general compositional formula:

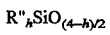

wherein R" is as defined above and h is a positive number of 1.9 to 2.25.

Examples of the organopolysiloxane (h) include dimethylpolysiloxane blocked with a dimethylvinylsilyl radical at either end, dimethylpolysiloxane-methylvinylsiloxane copolymers blocked with a dimethylvinylsilyl radical at either end, dimethylpolysiloxane-diphenylsiloxane-methylvinylsiloxane copolymers blocked with a dimethylvinylsilyl radical at either end, dimethylpolysiloxane blocked with a trivinylsiloxy radical at either end, dimethylpolysiloxane-methylvinylsiloxane copolymers blocked with a trivinylsiloxy radical at either end, dimethylpolysiloxane-diphenylsiloxane-methylvinylsiloxane copolymers blocked with a methylphenylvinylsilyl radical at either end, and methyl(3,3,3-trifluoropropyl)polysiloxane blocked with a dimethylvinylsilyl radical at either end.

Examples of the organic peroxide catalyst (i) include benzoyl peroxide, o-monochlorobenzoyl peroxide, bis-2,4-dichlorobenzoyl peroxide, dicumyl peroxide, t-butyl benzoate, di-t-butyl peroxide, p-monochlorobenzoyl peroxide, t-butylcumyl peroxide, 1,1,-bis(t-butylperoxy)-3,3,5-trimethylcyclohexane, 2,5-dimethyl-2,5-bis(t-butylperoxy)hexane, and 1,6-bis(t-butylperoxycarboxy)hexane. The catalyst may be used in a catalytic amount, usually in an amount of 0.1 to 5 parts, preferably 0.5 to 3 parts by weight per 100 parts by weight of organopolysiloxane (h)

In addition to the above-mentioned components, fillers may be blended in an amount of 0 to 100 parts, preferably 1 to 80 parts, more preferably 5 to 60 parts by weight per 100 parts by weight of organopolysiloxane (h) in the silicone rubber composition for adjusting the flow thereof or improving the mechanical strength of molded parts. In case of using reinforcing fillers, they are blended in an amount of 0 to 50 parts, preferably 5 to 40 parts, more preferably 10 to 30 parts by weight per 100 parts by weight of organopolysiloxane (e). Exemplary fillers include reinforcing fillers such as precipitated silica, fumed silica, calcined silica, and fumed titanium oxide, and non-reinforcing fillers such as ground quartz, diatomaceous earth, asbestos, aminosilicic acid, iron oxide, zinc oxide, and calcium carbonate. The fillers may be used with or without surface treatment with organic silicon compounds such as hexamethyldisilazane, trimethylchlorosilane and polymethylsiloxane. If desired, pigments, heat resistance modifiers, flame retardants, plasticizers or the like may be blended.

For taking full advantage of the characteristics of silicone resin and silicone rubber, respectively, it is preferred that a cured product of the silicone resin composition have a hardness of at least 85, especially at least 90 as specified in JIS K-6301 and measured on a Type A spring hardness tester, and a cured product of the silicone rubber composition have a hardness of 20 to 85, especially 30 to 70 as specified in JIS K-6301 and measured on a Type A spring hardness tester.

The composite material according to the present invention may have any desired construction. Often, a portion or all of one surface of a cured product of a silicone rubber composition (simply referred to as silicone rubber) overlies a portion or all of one surface of a cured product of a silicone resin composition (simply referred to as silicone resin). Alternatively, a silicone resin or rubber layer is sandwiched between silicone rubber or resin layers.

The composite material of the invention has silicone resin and silicone rubber integrated firmly together without using an adhesive so that it is more effective for preventing strain occurrence due to different coefficients of thermal expansion as compared with composite materials of silicone rubber with other reins. Since both parts have siloxane bonds as the backbone, they both have the advantages of heat resistance, low-temperature properties and weatherability attributable to the siloxane bonds. Therefore, the composite material finds application as connectors, gaskets, and insulating parts in electric and electronic equipment, business machines, automobiles, and precision machines.

The silicone resin/silicone rubber composite material of the invention is prepared by first molding a silicone resin composition into a desired shape by any suitable technique such as casting, compression molding, injection molding, extrusion molding and transfer molding, heat curing or semi-curing it, then molding a silicone rubber composition in close contact with the cured or semi-cured resin by any suitable technique, and curing the silicone rubber composition to the cured resin. The semi-cured silicone resin should reach at least a curing level capable of forming a non-intermixing interface when the silicone rubber composition is molded thereover in a close contact relationship. The conditions under which the silicone resin and rubber compositions are cured may be suitably determined without undue experimentation. After they are cured, they may be subject to post-curing if desired.

EXAMPLE

Examples of the present invention are given below by way of illustration and not by way of limitation. Unless otherwise stated, all parts and percents are by weight.

Example 1

A silicone resin composition (A) was prepared by mixing 100 parts of an organopolysiloxane of the average compositional formula (2) shown below, 10 parts of an organohydrogenpolysiloxane of the average compositional formula (3) shown below, and 1.2 parts of an isopropanol solution of chloroplatinic acid (platinum content 0.20%).

$$(CH_3)_{1.02}(C_6H_5)_{0.40}(CH_2=CH)_{0.08}SiO_{1.25} \quad (2)$$

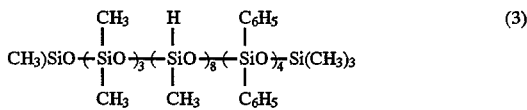

$$\text{CH}_3\text{)SiO} \left( \underset{\underset{\text{CH}_3}{|}}{\overset{\overset{\text{CH}_3}{|}}{\text{SiO}}} \right)_{\!\!\frac{1}{3}} \!\!\!\left( \underset{\underset{\text{CH}_3}{|}}{\overset{\overset{\text{H}}{|}}{\text{SiO}}} \right)_{\!\!\frac{1}{8}} \!\!\!\left( \underset{\underset{\text{C}_6\text{H}_5}{|}}{\overset{\overset{\text{C}_6\text{H}_5}{|}}{\text{SiO}}} \right)_{\!\!\frac{1}{4}} \!\!\text{Si(CH}_3)_3 \quad (3)$$

A silicone rubber composition (B) was prepared by adding 30 parts of dry silica having a specific surface area of 200 m²/g, 5 parts of dimethoxydimethylsilane, and 1 part of water to 100 parts of a dimethylpolysiloxane blocked with a dimethylvinylsiloxy radical at either end and having a viscosity of 100 poise at 25° C., mixing them while heating the mixture at 150° C. for 3 hours, and adding to the mixture 50 parts of the same polysiloxane as above, 0.4 parts of a dimethylsiloxane copolymer (consisting of 50 mol % of dimethylsiloxane units and 50 mol % of methylhydrogensiloxane units) blocked with a trimethylsilyl radical at either end and having a viscosity of 10 centipoise at 25° C., and 0.1 part of an isopropanol solution of chloro-platinic acid (platinum content 0.50%).

Next, silicone resin composition (A) was poured into a cavity 2 of a lower mold section 1 to about one half of the cavity volume as shown in FIGURE 1 and cured therein by heating at 150° C. for 5 minutes. An upper mold section 3 was placed on the lower mold section 1 to close the cavity 2. Silicone rubber composition (B) was injected onto the cured silicone resin (A) through a port 4 in the upper mold section 3 at an injection pressure of about 60 kg/cm² and cured therein by heating at 150° C. for 5 minutes. There was obtained an integral product in which silicone resin and silicone rubber were firmly bonded. The product could be removed from the mold without sticking to the mold wall.

The cured product of silicone resin composition (A) had a hardness of more than 95 on the measurement by using a Type A spring hardness tester according to the method described in JIS K-6301. The cured product of silicone rubber composition (B) had a hardness of 35 on the same Type A spring hardness tester measurement.

For comparison purpose, the following experiment was conducted.

The cured product of the silicone rubber composition (B) was prepared by using the mold shown in FIGURE 1 and injecting the composition (B) into the cavity 2 of the lower mold section 1 through the port 4 of the upper mold section 3 placing on the lower mold section 1 at an injection pressure of about 60 kg/cm² to cure the composition (B) by heating at 150° C. for 5 minutes. Then the cured product was taken out from the mold and cut into halves. Next, one half of the cured product was inserted in the cavity 2 of the lower mold section 1 so that the cut surface of the cured product was positioned as the upper surface. The silicone resin composition (A) was poured on the cut surface of the cured silicone rubber (B) and cured in the cavity 2 by heating at 150° C. for 5 minutes.

The cured product of the silicone resin composition (A) was not bonded to the cured silicone rubber (B) at all. The cured silicone resin (A) was easily separated from the cured silicone rubber (B).

The same result was obtained when the silicone resin composition (A) was poured on the non-cut surface of the cured silicone rubber (B).

Example 2

A silicone rubber composition (C) was prepared by adding 30 parts of dry silica having a specific surface area of 200 m²/g, 5 parts of dimethoxydimethylsilane, and 1 part of water to 100 parts of a dimethylpolysiloxane blocked with a trivinylsiloxy unit at either end and having a viscosity of 1,000 poise at 25° C., mixing them while heating the mixture at 150° C. for 3 hours, and adding to the mixture 50 parts of the same polysiloxane as above and 1.0 part of 1,6-bis(t-butylperoxy)hexane.

As in Example 1, silicone resin composition (A) was cured in the mold and silicone rubber composition (C) was injected onto the cured silicone resin (A) and cured by heating at 150° C. for 5 minutes. There was obtained an integral product in which silicone resin and silicone rubber were firmly bonded. The product could be removed from the mold without sticking to the mold wall.

The cured product of silicone rubber composition (C) had a hardness of 40 on the measurement by using a JIS A spring hardness tester according to JIS K-6301.

Comparative Example

To a mixture of 100 parts of a dimethylpolysiloxane represented by the average formula:

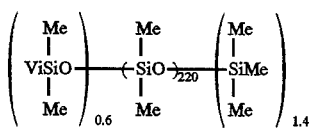

with a viscosity of 800 cP and 0.7 part of a polymethylhydrogensiloxane represented by the average formula:

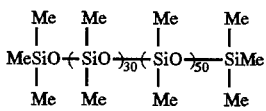

with a viscosity of 100 cP was added a 2-ethylhexanol solution of chloroplatinic acid in an amount of 5 ppm, calculated as platinum, based on the total amount of the polysiloxanes, followed by mixing uniformly to prepare a curable organopolysiloxane composition. The composition was poured in an aluminum disk having a diameter of 60 mm and was cured by heating at 150° C. for 30 minutes, to be a silicone gel product having a diameter of 60 mm and a thickness of 5 mm with a rubber hardness of 0 on the measurement by using a JIS A spring hardness tester according to JIS K 6301 and a penetration of 80 (ASTMD 1403).

Next, as in Example 1, silicone resin composition (A) was poured on the above silicone gel and cured by heating at 150° C. for 30 minutes.

The cured product of the silicone resin composition (A) was not bonded to the silicone gel and was easily separated from the silicone gel.

There have been described silicone resin/silicone rubber composite materials in which silicone resin and silicone rubber are firmly joined together. They are useful in various industrial fields including electric and electronic equipment, business machines, automobiles, and precision machines.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone resin/silicone rubber composite material comprising (a) a cured product of an addition curable silicone resin composition having a hardness of at least 85 as specified in JIS K-6301 and measured on a Type A spring hardness tester, integrated with (b) a cured product of an addition or peroxide curable silicone rubber composition having a hardness of 20 to 85 as specified in JIS K-6301 and measured on a Type A spring hardness tester, that is obtained by curing or semi-curing the addition curable silicone resin composition (a), placing the addition or peroxide curable silicone rubber composition (b) in close contact with the cured or semi-cured silicone resin composition (a), and heat curing the silicone rubber composition (b), said silicone resin composition (a) comprising an organopolysiloxane of the following general formula (1):

$$R_n(C_6H_5)_m SiO_{(4-n-m)/2} \qquad (1)$$

wherein R is independently a substituted or unsubstituted aliphatic or alicyclic monovalent hydrocarbon radical having 1 to 20 carbon atoms, 0.1 to 30 mol % of R being an aliphatic unsaturated hydrocarbon radical, and letters n and m are positive numbers satisfying $1 \leq n+m < 2$ and $0.05 \leq m/(n+m) \leq 0.5$.

2. The silicone resin/silicone rubber composite material according to claim 1, wherein said silicone resin composition (a) further comprises an organohydrogenpolysiloxane that is liquid at room temperature and an addition reaction catalyst.

3. The silicone resin/silicone rubber composite material according to claim 2, further comprising an organopolysiloxane containing two or more alkenyl radicals in a molecule that is liquid or raw rubber at room temperature.

4. The silicone resin/silicone rubber composite material according to claim 2, wherein said organohydrogenpolysiloxane that is liquid at room temperature has the formula $$R'_a H_b SiO_{(4-a-b)/2}$$

wherein R' represents an unsubstituted or substituted monovalent hydrocarbon radical having 1 to 10 carbon atoms excluding an aliphatic unsaturated radical, "a" is a positive number of 1 to 2.1, "b" is a positive number of 0.5 to 1 and a+b is 1.5 to 2.6.

5. The silicone resin/silicone rubber composite material according to claim 2, wherein said organohydrogenpolysiloxane is present in an amount of about 1 to 50 parts by weight per 100 parts by weight of the organopolysiloxane having formula (1).

6. The silicone resin/silicone rubber composite material according to claim 3, wherein the organopolysiloxane containing two or more alkenyl radicals in a molecule has the general compositional formula:

$$R''_c SiO_{(4-c)/2}$$

wherein R" is an unsubstituted or substituted monovalent hydrocarbon group having 1 to 10 carbon atoms and d is a positive number of 1.8 to 2.4.

7. The silicone resin/silicone rubber composite material according to claim 6, wherein the organopolysiloxane containing two or more alkenyl radicals in a molecule is selected from the group consisting of dimethylpolysiloxane blocked with a dimethylvinylsilyl radical at either end, dimethylpolysiloxane-methylvinylsiloxane copolymers blocked with a dimethylvinylsilyl radical at either end, dimethylpolysiloxane-diphenylsiloxane-methylvinylsiloxane copolymers blocked with a dimethylvinylsilyl radical at either end, dimethylpolysiloxane-diphenylsiloxane-methylvinylsiloxane copolymers blocked with a methylphenylvinylsilyl radical at either end, and methyl(3,3,3-trifluoropropyl)polysiloxane blocked with a dimethylvinylsilyl radical at either end.

8. The silicone resin/silicone rubber composite material according to claim 3, wherein the organopolysiloxane containing two or more alkenyl radicals in a molecule is present in an amount of 0 to 100 parts by weight per 100 parts by weight of the organopolysiloxane having formula (1).

9. The silicone resin/silicone rubber composite material according to claim 3, wherein the organopolysiloxane containing two or more alkenyl radicals in a molecule is present in an amount of 1 to 50 parts by weight per 100 parts by weight of the organopolysiloxane having formula (1).

10. The silicone resin/silicone rubber composite material according to claim 1, wherein said silicone rubber composition (b) comprises an organopolysiloxane containing on average at least two lower alkenyl radicals per molecule, an organohydrogenpolysiloxane having at least two hydrogen atoms attached to silicon atoms in a molecule and an addition reaction catalyst.

11. The silicone resin/silicone rubber composite material according to claim 1, wherein said silicone rubber composition (b) comprises an organopolysiloxane containing on average at least two lower alkenyl radicals per molecule and an organic peroxide catalyst.

12. A method for preparing a silicone resin/silicone rubber composite material comprising the steps of:

curing or semi-curing an addition curable silicone resin composition (a), placing an addition or peroxide curable silicone rubber composition (b) in close contact with the cured or semi-cured product (a), and heat curing the silicone rubber composition (b), said silicone resin composition (a) comprising an organopolysiloxane of the following general formula (1):

$$R_n(C_6H_5)_m SiO_{(4-n-m)/2} \qquad (1)$$

wherein R is independently a substituted or unsubstituted aliphatic or alicyclic monovalent hydrocarbon radical having 1 to 20 carbon atoms, 0.1 to 30 mol % of R being an aliphatic unsaturated hydrocarbon radical, and letters n and m are positive numbers satisfying $1 \leq n+m < 2$ and $0.05 \leq m/(n+m) \leq 0.5$, the cured resin (a) having a hardness of at least 85 as specified in JIS K-6301 and measured on a Type A spring hardness tester, and the cured rubber (b) having a hardness of 20 to 85 as specified in JIS K-6301 and measured on a Type A spring hardness tester.

* * * * *